United States Patent [11] 3,587,059

[72] Inventors James A. Kennedy
Phoenix, Ariz.;
John F. Couleur, Dallas, Tex.
[21] Appl. No. 841,374
[22] Filed July 14, 1969
[45] Patented June 22, 1971
[73] Assignee General Electric Company

[54] APPARATUS FOR TRANSFERRING DATA FROM A PLURALITY OF LOW-SPEED DEVICES TO A HIGH-SPEED PROCESSOR
16 Claims, 13 Drawing Figs.

[52] U.S. Cl. 340/172.5
[51] Int. Cl. G06f 3/00
[50] Field of Search 340/172.5; 235/157

[56] References Cited
UNITED STATES PATENTS

| | | | |
|---|---|---|---|
| 2,960,683 | 11/1960 | Gregory et al. | 340/172.5 |
| 3,193,801 | 7/1965 | Grondin | 340/172.5 |
| 3,257,645 | 6/1966 | Lekven | 340/172.5 |
| 3,312,945 | 4/1967 | Berezin et al. | 340/172.5 |

*Primary Examiner*—Gareth D. Shaw
*Attorneys*—Lloyd B. Guernsy, Edward W. Hughes, Frank L. Neuhauser, Oscar B. Waddell and Joseph B. Forman

ABSTRACT: The apparatus for transferring data between a high-speed processor and a plurality of low-speed devices includes a data recirculator connected between the data processor and a plurality of peripheral devices. A timing module supplies signals which causes the data from the plurality of peripheral devices to be sampled sequentially and to be stored in the data recirculator until the register is full of data. The data is then transferred in parallel to the the data processor.

PATENTED JUN 22 1971 3,587,059

SHEET 01 OF 12

INVENTOR.
JAMES A. KENNEDY
JOHN F. COULEUR
BY Lloyd B. Guernsey
AGENT

APPARATUS FOR TRANSFERRING DATA FROM A PLURALITY OF LOW-SPEED DEVICES TO A HIGH-SPEED PROCESSOR

BACKGROUND OF THE INVENTION

This invention relates to data processors and more particularly to apparatus for efficiently transferring data between a high-speed data processor and a plurality of low-speed peripheral devices. In modern high-speed data processing systems, one of the problems in the efficient use of the systems is the transferring of data from a low-speed peripheral device such as a printer, card reader, teletypewriter, tape handler, etc. to a high-speed data processor which can operate at a speed many times faster than any of these peripheral devices. If data is transferred from one of these devices directly to the processor, the processor spends a large percentage of its time waiting for the data.

Prior art systems employ a plurality of buffer registers wherein a pair of registers is connected between the data processor and a corresponding one of the peripheral devices. Data is transferred from the peripheral device bit serially, or one bit at a time, and stored in a first buffer register. While data is being transferred from the peripheral device to the first buffer register the data processor can be operating upon data from other devices or performing other tasks. When the register is full the data is transferred in bit parallel, or all at once, from the first register to the processor. Data is transferred in bit parallel from the processor to a second buffer register where it is stored and transferred bit serially to the peripheral device at the correct time. Such prior art systems require at least two buffer registers between each peripheral and the data processor. When several peripheral devices are used in a system, the system becomes bulky and expensive to construct.

The present invention alleviates the disadvantages of the prior art by providing a data recirculator which sequentially stores data from each of the peripheral devices in the data processing system. The data comprises a variety of characters made from various combinations of data bits (binary digits). When the data bits which comprise a complete character are stored in the data recirculator, these data bits which comprise a complete character are transferred in parallel to the data processor. In a typical system, data from 64 peripheral devices is stored in a single data recirculator. A counter coupled to the data recirculator counts the number of times that data circulates through the recirculator and provides a precision time base for the synchronizing of data from the various peripheral devices. This precision time base provides synchronization so that the peripheral devices may be asynchronous.

It is, therefore, an object of this invention to provide an improved means for transferring data between a low-speed peripheral device and a high-speed data processor.

Another object of this invention is to provide a new and improved means for transferring data between a plurality of low-speed peripheral devices and a high-speed data processor.

A further object of this invention is to provide a new and improved means for transferring data between a low-speed asynchronous device and a high-speed data processor.

Still another object of this invention is to provide a new and improved means for transferring data between a plurality of low-speed asynchronous devices and a high-speed data processor.

SUMMARY OF THE INVENTION

The foregoing objects are achieved in the instant invention by providing a data recirculator comprising a shift register and a sonic delay line in which data bits from a plurality of peripheral devices may be entered serially. When data bits comprising a complete character from one of the peripheral devices are stored in the data recirculator, these data bits are transferred in parallel to the data processor.

BRIEF DESCRIPTION OF THE DRAWINGS

Other objects and advantages of this invention will become apparent from the following description when taken in connection with the accompanying drawings.

GLOSSARY AND INDEX OF SIGNALS

In order to more readily understand the disclosed invention, the signals provided in the various parts of the system are tabulated below.

| Signals | Description of signals |
|---|---|
| CN (0–63) | Channel number 0 through 63. |
| RCC (1–45) | Receiver Circulator Count 1 through 45. |
| RCN (0–63) | Receive Channel Number 0 through 63. |
| TCC (1–45) | Transmit Circulator Count 1 through 45. |
| TCN (0–63) | Transmit Channel Number 0 through 63. |

DESCRIPTION OF PREFERRED EMBODIMENT

Figure 1:
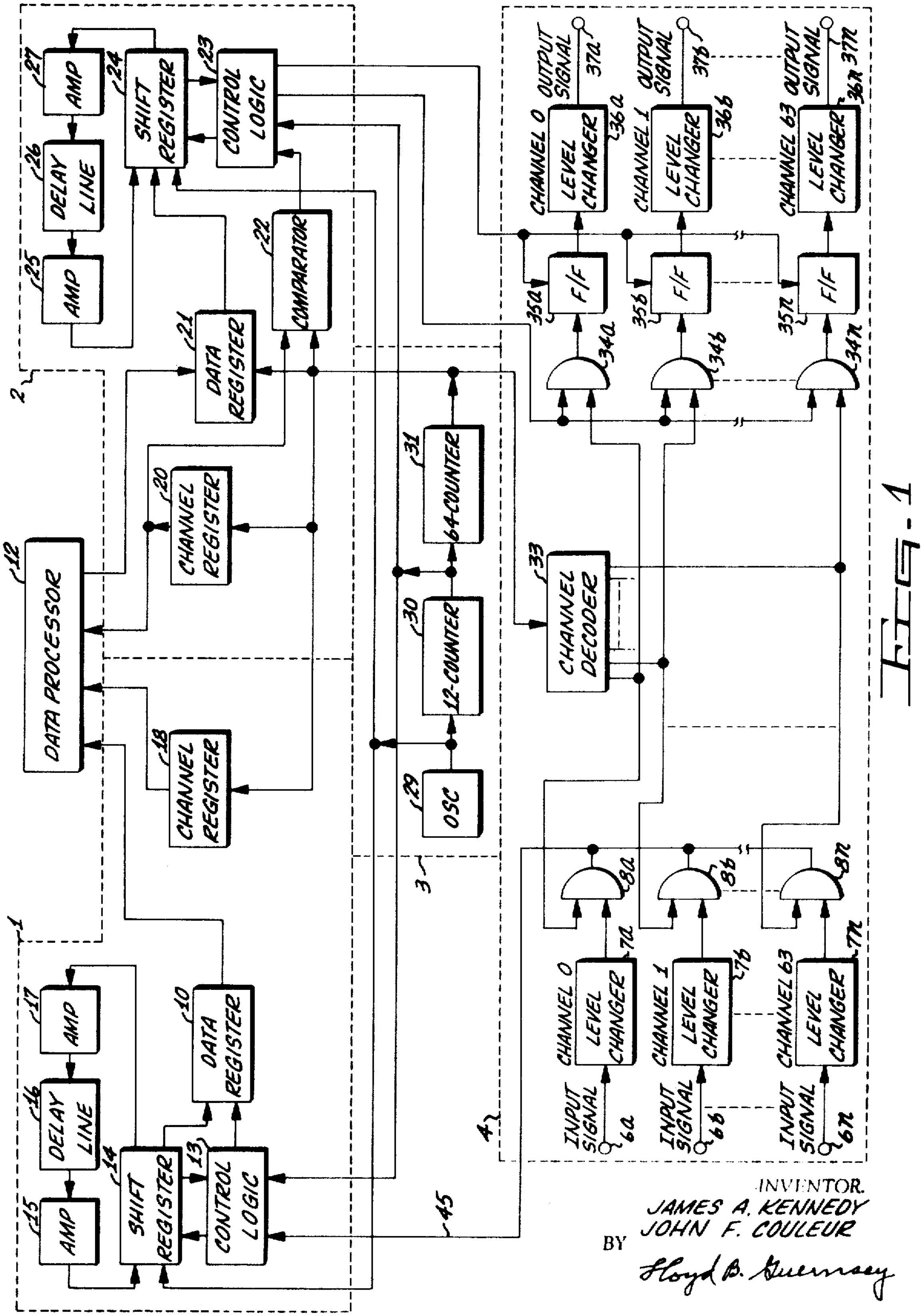
FIG. 1 is a simplified block diagram of apparatus for transferring data from a plurality of low-speed devices to a high-speed processor embodying the invention.

The apparatus for transferring data from a plurality of low-speed devices to a high-speed data processor as shown in FIG. 1 includes a receive module 1, a transmit module 2, a timing generator 3, and an input/output module 4. The system shown in FIG. 1 indicates that channels 0-63 can be connected to a plurality of teletypewriters or other input devices to provide input signals at the left of the diagram and that channels 0-63 can provide output signals to a plurality of peripheral devices at the right of the diagram. It should be understood, however, that any reasonable number of teletypewriters or other peripheral devices may be connected to the input and to the output terminals. The timing generator 3 provides signals which successively enable AND-gates 8*a*–8*m* so that signals coming into signal-input terminal 6*a*–6*n* are successively coupled to a receive recirculator in module 1. The receive recirculator comprises a shift register 14, amplifiers 15 and 17 and a sonic delay line 16. Data bits from each of the signal-input terminals are moved, one bit at a time into the receive recirculator until a complete character from one of the channels is assembled in the receive recirculator. When a complete character has been assembled in the receive recirculator this character is transferred in bit parallel to a data register 10 in the receive module and is then transferred upon request to the data processor or computer 12.

The data is shifted into and out of the receive recirculator under the control of the receive control logic 13. The receive control logic 13 causes data bits which comprise a character to be stored in an orderly manner in the receive recirculator so that the data from channel 0 through channel 63 is successively circulated through the shift register. For example, the data from channel 0 is circulated through the shift register 14 followed by the data from channel 1, etc. followed by the data from channel 63 which is followed by the data from channel 0 again.

An oscillator 29 in timing generator 3 supplies pulses to the shift register 14 which causes the data bits from the channel 0-63 to be shifted through the receive recirculator. The pulses from the oscillator 29 are coupled to the 12-counter 30 which divides the frequency by 12 to develop logic pulses which are coupled to the receive control logic 13, the transmit control logic 23 and the 64-counter 31. The frequency of the logic pulses which are coupled to counter 31 is divided by 64 in counter 31. Counters 30 and 31 together count the total number of bits in the receive recirculator and by their state at any instant of time indicate the positional location of the bits at that time. Counter 31 provides signals to the channel decoder 33 in the input/output module 4. These signals cause channel decoder 33 to sequentially enable gates *8a–8n* and gates *34a–34n* so that input channels 0-63 are sequentially connected to receive control logic 13 and output channels 0-63 are sequentially connected to transmit control logic 23. Counter 30 also supplies signals to the receive channel register 18 which keeps track of the channel information which is stored in the data register 10. The data from register 10 and the channel count from register 18 are supplied to the data processor 12.

When it is desired that the information be sent from the data processor 12 to the peripheral devices the channel number of the desired data is stored in transmit channel register 20 and the data from this channel is moved from the data processor to the transmit register 21. The channel number information which is stored in the transmit data register 21 and the channel count from the counter 31 are both applied to a comparator 22. The comparator 22 compares the number in the channel register 20 and the number in the counter 31 and when these two numbers are identical the data from data register 21 is transferred by logic control 23 to the shift register 24.

This data which is placed in the shift register 24 circulates through amplifier 27, delay line 26, amplifier 25 and register 24 in a manner similar to that described in connection with the receive module 1. The data from shift register 24 is sent one bit at a time by the control logic 23 to the AND-gates *34a–34n*. At the same time the channel count from counter 31 is sent to the channel decode 33 which supplies signals which enable the corresponding AND-gate *34a–34n* so that this data is stored in the corresponding flip-flop *35a–35n*. The data stored in the flip-flop *35a–35n* is then sent through one of the level changers *36a–36n* to one of the output terminals *37a–37n* and is coupled to one of the peripheral devices such as a teletypewriter which may be connected to the output terminal.

LOGIC COMPONENTS

Flip-Flop

Figure 6:
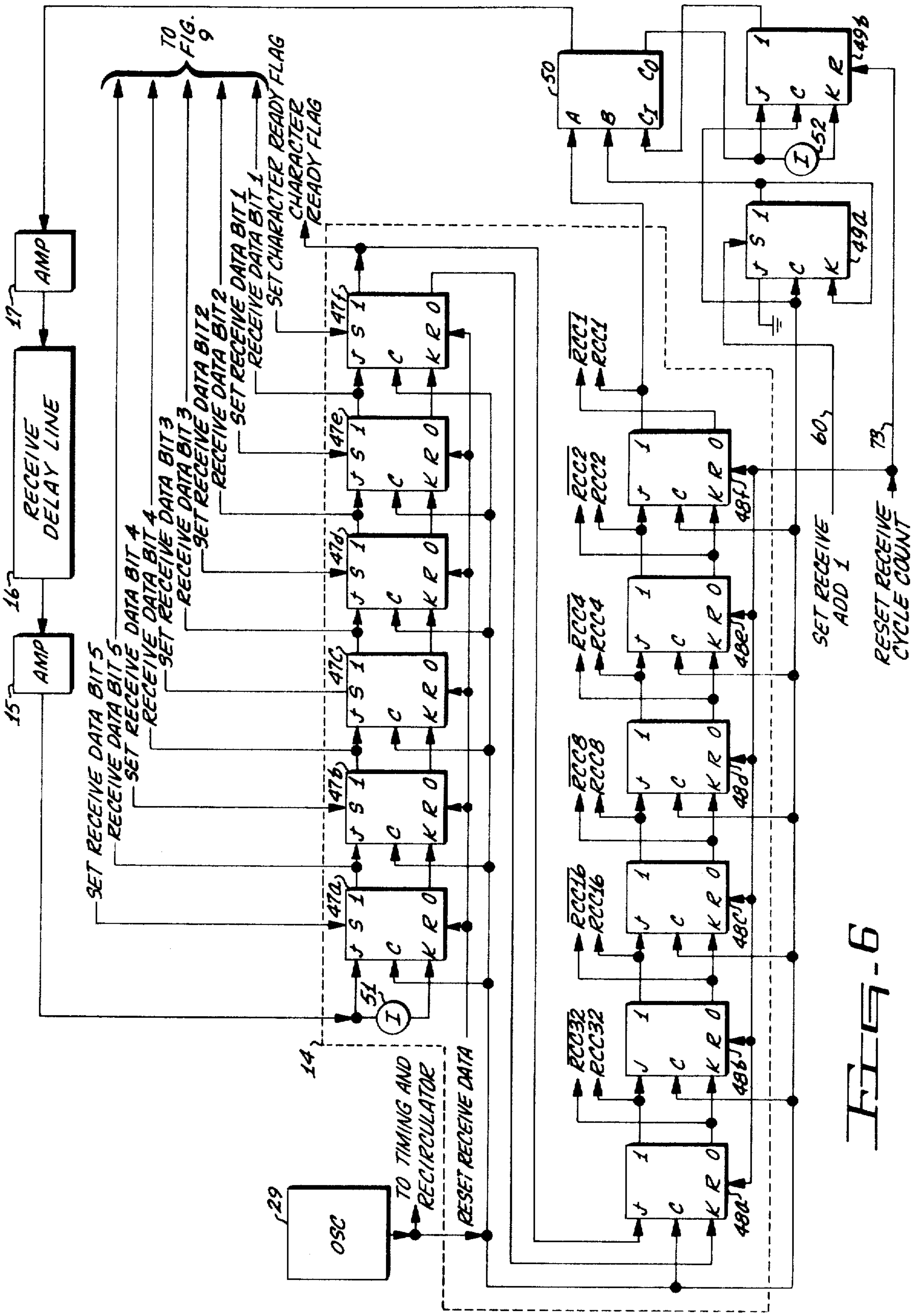
FIG. 6 is an expansion of the receive data recirculator shown in FIG. 1.

The flip-flop or bistable multivibrators referred to in the specification, and shown, for example, in FIG. 6 of the drawings, are circuits adapted to operate in either one of two stable states and to transfer from the state in which they are operating to the other stable state upon the application of a trigger signal thereto. In one state of operation, the flip-flop represents the binary one (1-state) and in the other state, the binary 0 (0-state). The three leads entering the left-hand side of the flip-flop symbol, for example flip-flop number *47a*, shown in FIG. 6, provide the required trigger signals. The upper lead, the J lead, provides the set signal, the lower lead, the K lead, provides the reset input signal and the center lead provides the trigger signal. When the set input signal, on the J lead, is positive and the reset signal, on the K lead, is zero, a positive trigger pulse, on the C lead, causes the flip-flops to transfer to the 1-state, if it is not already in the 1-state. When the reset signal is positive and the set signal is zero, a positive trigger pulse causes the flip-flop to transfer to the 0-state if it is not already in the 0-state.

When the J and K input leads are both positive, or when the J and K leads are not connected to an external signal source, a positive trigger pulse causes the flip-flop to change states. The S lead entering the top of the flip-flop and the R lead entering the bottom of the flip-flop also provide set and reset signals respectively. When a zero voltage potential is applied to the S lead the flip-flop sets to the 1-state and remains in the 1-state as long as the zero voltage potential remains on the S lead irrespective of any signals on the J, C and K leads. When a zero voltage potential is applied to the R lead the flip-flop resets to the 0-state and remains in the 0-state as long as the zero voltage potential remains on the R lead, irrespective of any signals on the J, C and K leads. Some flip-flops do not provide these S and R leads. The two leads leaving the right-hand sides of the flip-flop deliver the output signals for each flip-flop. The upper output lead, the 1 output leads, deliver the 1 output signals of the flip-flop and the lower output leads, the 0 output leads, deliver the 0 output signals.

AND-gate

Figure 7:
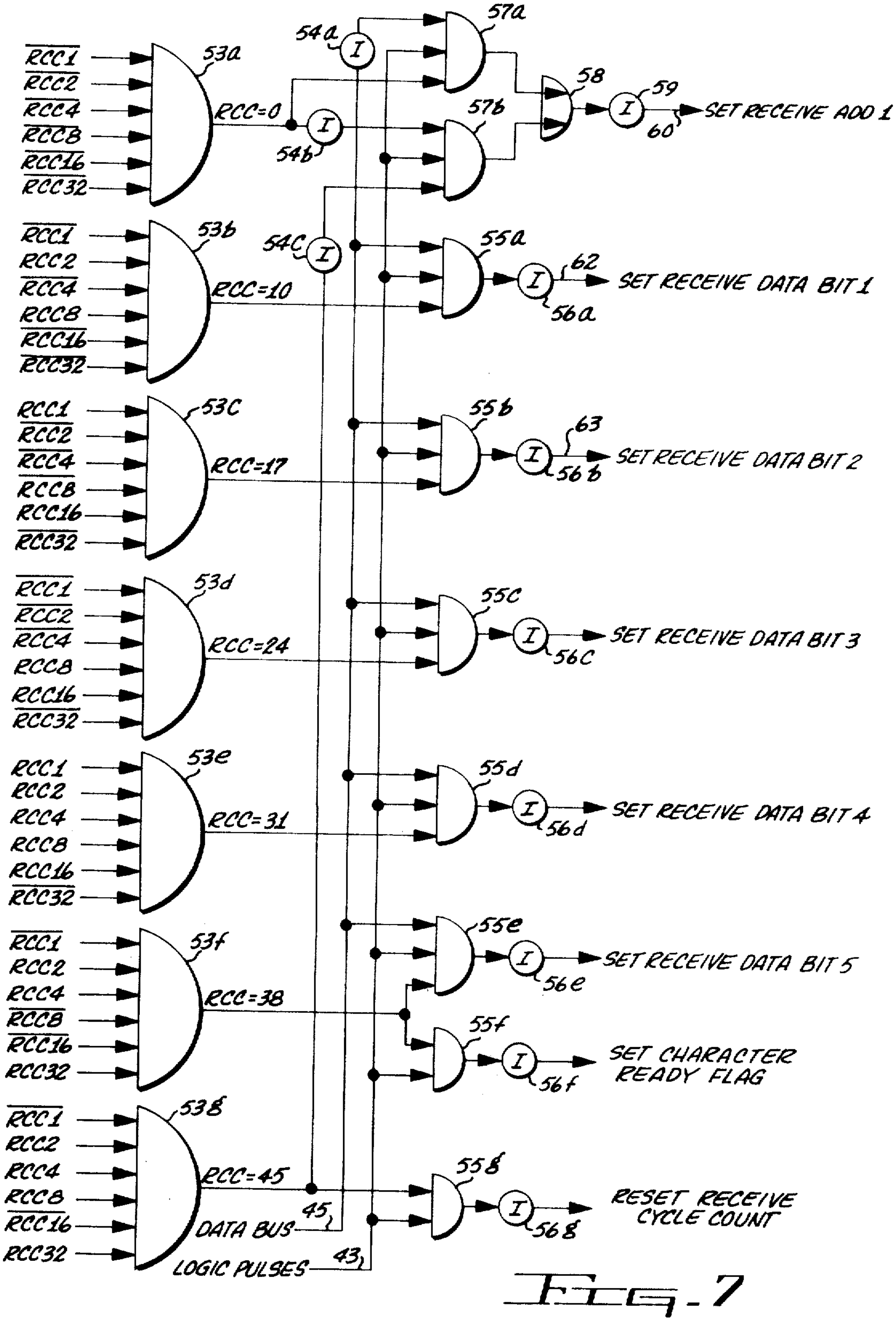
FIG. 7 shows the diagram of the receive control logic for the invention shown in FIG. 1.

The AND-gates disclosed in the drawings and particularly in FIG. 7 provide the logical operation of conjunction of binary signals applied thereto. In the system disclosed, since the binary 1 is represented by a positive signal, the AND-gates provide a positive output signal representing a binary 1 when, and only when all of the input signals applied thereto are positive and represent binary 1's. The symbols identified by the numerals *53a–53g* in FIG. 7 represent six input AND-gates. Such AND-gates deliver a binary 1 output signal only when each of the six input signals applied thereto represent a binary 1. A three input AND-gate, such as represented by AND-gate *55a*, delivers a binary 1 output only when each of the three input signals represent a binary 1.

OR-gate

The OR-gate disclosed in FIG. 7 provides a logical operation of inclusive OR for binary 1 input signals applied thereto. In the system, since the binary 1 is represented by a positive signal, the OR-gate provides a positive output signal representing a binary 1 when any one or more of the input signals applied thereto are positive and represent binary 1's. The symbol identified by gate 58 in FIG. 7 represents a two input OR-gate. This OR-gate delivers a binary 1 output signal when any one or both of its input signals applied thereto represent a binary 1.

Inverter

The inverter disclosed in FIG. 7 and represented by numerals *54a–54c* provides a positive output signal representing a binary 1 when the input signal applied thereto is negative, representing a binary 0. Conversely, the inverter provides an output signal representing a binary 0 when the input signal represents a binary 1.

Full Adder

The full adder referred to in the specification and shown, for example, in FIG. 6 and represented by numeral 50 is a circuit which has three inputs and two outputs. When a positive signal representing a binary 1 is applied to any one of the inputs A, B, or $C_i$, a positive signal representing a binary 1 is present on the S, or sum, output terminal. When a binary 1 is present on any two of the input signals A, B, and $C_i$, a binary 0 is present at the sum output terminal but a binary 1 is present at the $C_0$ or carry output terminal. When a binary 1 is present at each of the three input terminals, a binary 1 is present at the S output terminal and a binary 1 is also present at the $C_0$ output terminal. A more complete discussion of the adder can be found on pages 160—166 of the textbook "Digital Computer Fundamentals" by Thomas C. Bartee, 2nd ed., McGraw-Hill, 1966.

Figure 4:
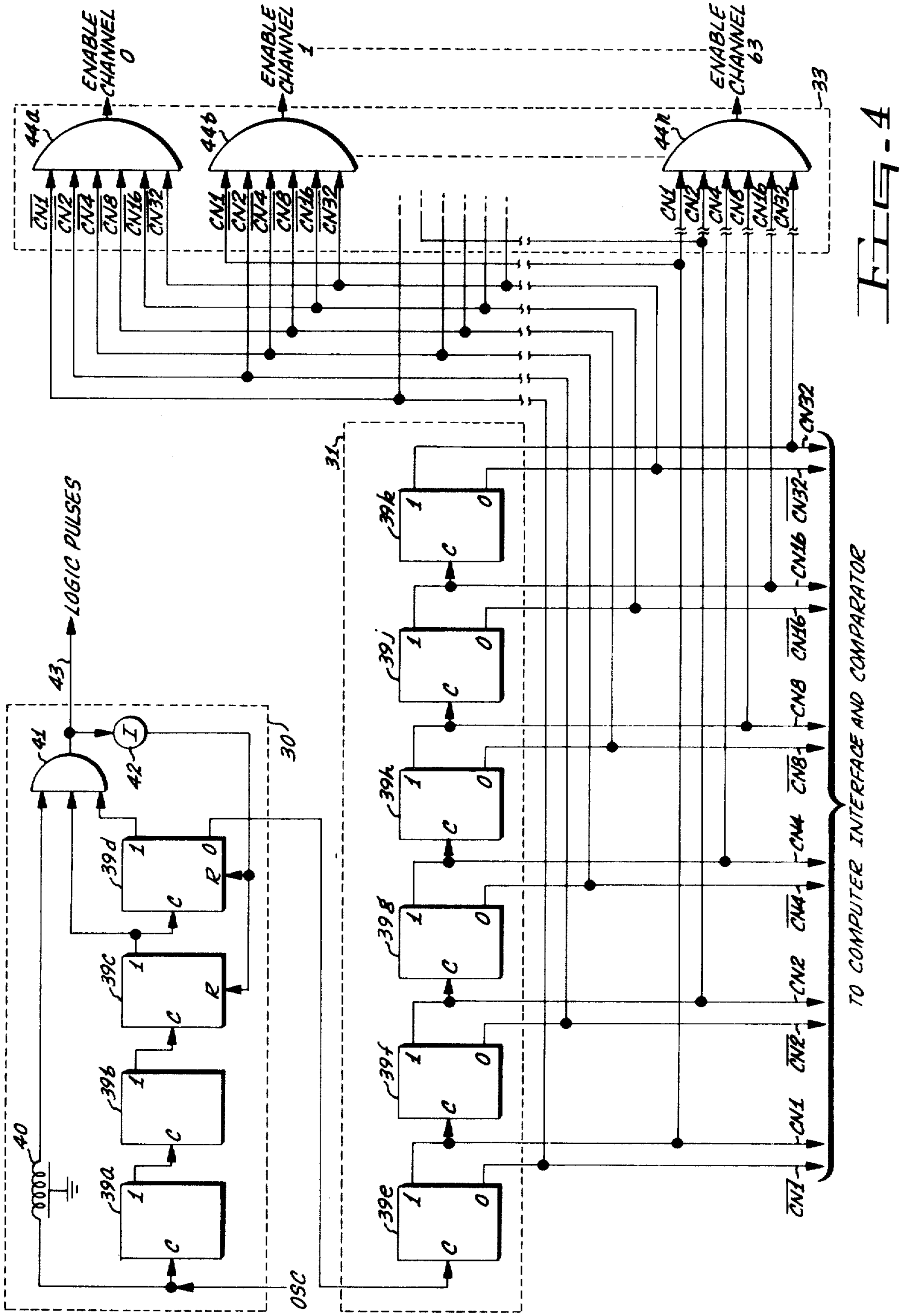
FIG. 4 is an expansion of a block diagram of FIG. 1 showing the timing generator and channel decoder portion of the system.

The operation of the timing generator 3 of FIG. 1 can be more clearly seen by referring to the diagram in FIG. 4. Pulses from the oscillator 29 are coupled to the input of the 12-counter 30 which comprises a plurality of flip-flops **39*a*–39*d*, a delay line 40, an AND-gate 41, and an inverter 42. When four pulses have been received at the input of flip-flop 39*a* a positive output voltage is produced at the 1 output terminal of flip-flop 39*a* and is applied to the center lead of AND-gate 41. When eight pulses have been received at the input of flip-flop 39*a* a positive voltage is applied from the 1 output of 39*d* to the lower input lead of AND-gate 41. When twelve pulses have been received a positive voltage from both the 1 output of flip-flop 39*c* and the 1 output of 39*d* is applied to the inputs of AND-gate 41 along with a pulse through delay line 40 so that an output logic pulse is obtained on output lead 43. At this same time, a pulse from output lead 43 is applied through inverter 42 to the reset terminals of flip-flops 39*c* and 39*d* so that these flip-flops are reset and the count starts at zero again. After each count of 12 a logic pulse is produced on output lead 43**.

A signal from the counter 30 is also applied to the input of the 64-counter 31 which comprises a plurality of flip-flops **39*e*–39. Before any pulses are received at the trigger input terminal of the flip-flop 39*e*, each of the flip-flops in the counter 31 developes a positive signal at the O-output lead. Thus, there is a positive signal on each of the leads $\overline{CN1}$, $\overline{CN2}$, $\overline{CN8}$, $\overline{CN16}$ and $\overline{CN32}$. All of the 1-output leads and the 0-output leads of flip-flops 39*e*–39*k* are connected to the channel decoder 33 which is also shown in FIG. 4. The signals from the 0-output leads of 39*e*–39*k* are applied to the inputs of an AND-gate 44*a* in channel decoder 33 so that a positive signal appears at the output of AND-gate 44*a* when the count in counter 31 is equal to zero. This positive signal provides an enable signal to the AND-gates 8*a* and 34*a* of channel 0 in the input/output module shown in FIG. 1 and FIG. 5. When the first pulse is applied to the trigger terminal of flip-flop 39*e* in counter 31, a positive signal is provided on the 1-output lead of flip-flop 39*e* thereby providing a positive signal on lead $\overline{CN1}$. All of the other 0-output leads on flip-flops 39*f*–39*k* have a positive signal so that positive signals are now produced on all of the input leads of AND-gate 44*b* causing gate 44*b* to provide a positive output signal. This positive output signal enables the AND-gate 8*b*** of channel 1 in the input/output module of FIG. 1

Figure 5:
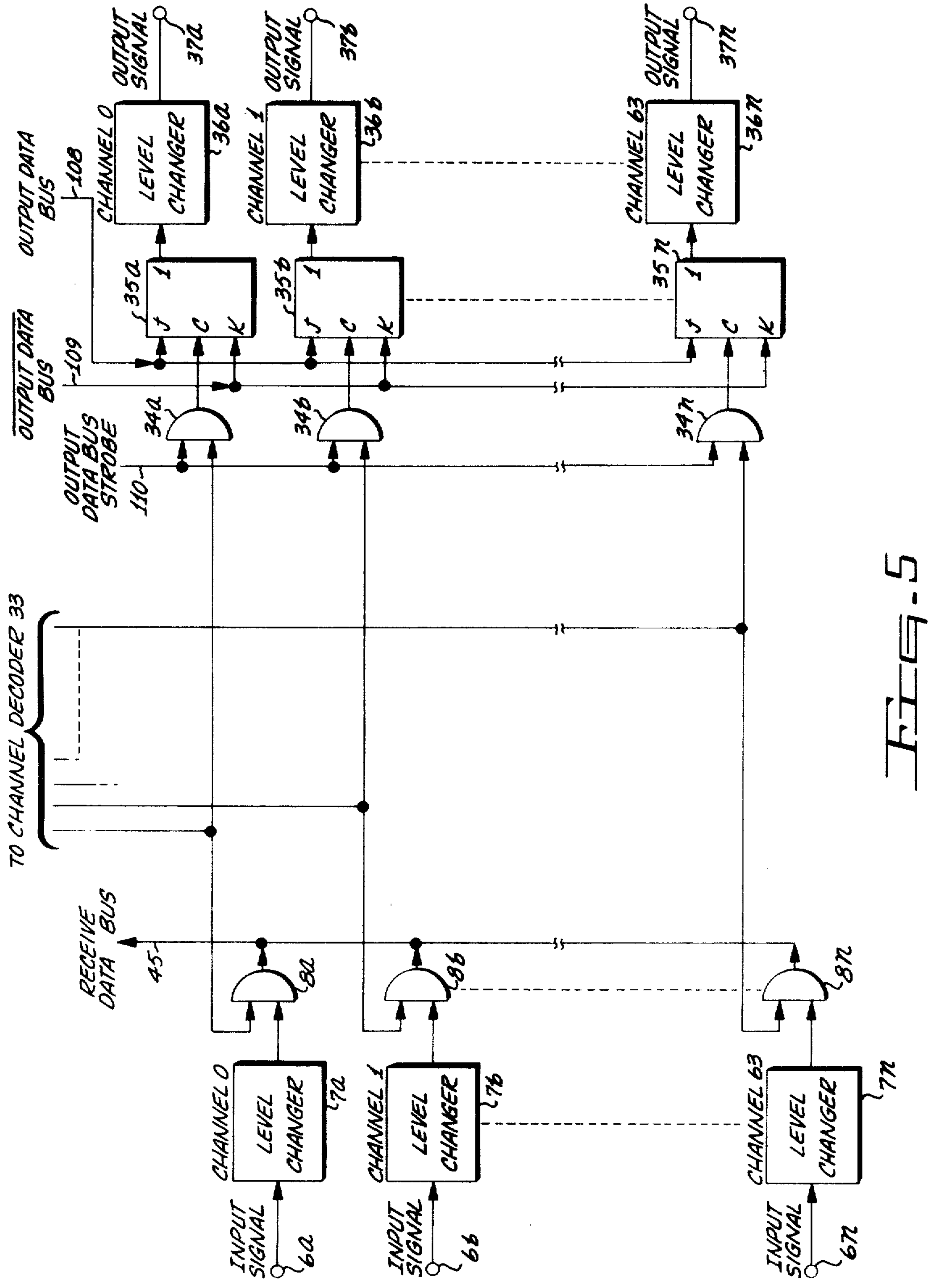
FIG. 5 is an expansion of a block diagram of FIG. 1 showing the details of the input and output sections which connect to the peripheral devices.

As the count in counter 31 proceeds, the leads from the flip-flops **39*e*–39*k* provide positive signals which sequentially enable the other gates 44*a*–44*n* thereby sequentially providing an enable signal to the AND-gates 8*a*–8*n* shown in FIG. 1 and in FIG. 5. Each time that one of the AND-gates 8*a*–8*n* is enabled signals which are applied to the lower input leads of these AND-gates are coupled to the receive data bus 45 which is connected to the receive control logic 13. At this same time, enable signals are provided sequentially to AND-gates 34*a*–34 shown in FIG. 1 and in FIG. 5. AND-gates 34*a*–34*n* sequentially supply trigger signals to flip-flops 35*a*–35*n*** so that data bits can be stored in these flip-flops. A more complete discussion of the binary counter shown in FIG. 4 can be found in the textbook "Digital Computer Fundamentals," 2nd ed., by Thomas C. Bartee, McGraw-Hill, 1966, on pages 94—96.

Figure 2:
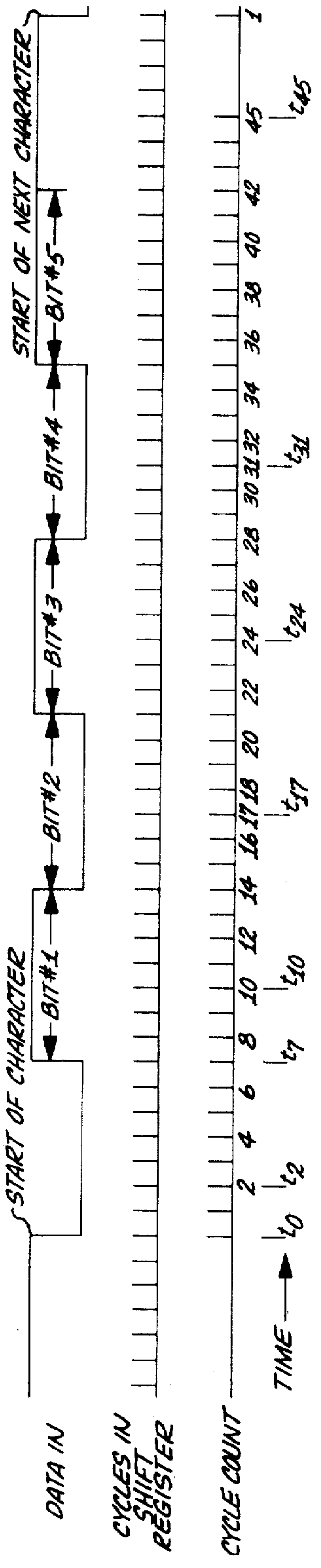
FIG. 2 shows a typical character as received at the input terminal of one of the devices shown in FIG. 1.

The operation of the receive module 1 will now be described in connection with FIGS. 2, 3, 6, and 7. FIG. 2 shows a typical character which may be received at any of the input terminals **6*a*–6*n* of the input/output module 4 of FIG. 1. The characters coming to the input terminal 6*a*–6*n* from the teletypewriter terminals are each composed of five-bits. Prior to the time that the character is received the signal at the input terminal has a positive value as shown prior to time $t_0$ in FIG. 2. The beginning of the character at time $t_0$ is characterized by a negative voltage applied to one of the input terminals 6*a*–6*n*. This negative voltage causes a pulse to be applied to flip-flop 49*a* which provides a signal to adder 50 shown in FIG. 6. This signal causes the adder 50 and the associated circuits to start counting the number of revolutions which words stored in the receive recirculator make through the recirculator. This is shown as the cycle count in FIG. 2. During the time that the negative voltage at the start of the character is applied to one of the input terminals 6*a*–6*n*, the words in the receive recirculator shown in FIG. 6 make seven complete revolutions through the shift register 14, the amplifiers 17 and 15, and delay line 16. The first bit of the character shown in FIG. 2 as starting at time $t_7$, may be either a positive signal or a negative signal. The five bits in each character are sampled near the center of the bits at times $t_{10}$, $t_{17}$, $t_{24}$, and $t_{31}$ as shown in FIG. 2. The end of the character is shown at time $t_{45}$ and is a positive signal. The receive module shown in FIG. 6 is designed to hold a total of 64 channel words with each word comprising one character from each of the input channels O—63 and in addition, contains the cycle count of the number of times that this character has circulated through the register 14, the amplifiers 17 and 15, and the receive delay line 16**.

Figure 3:
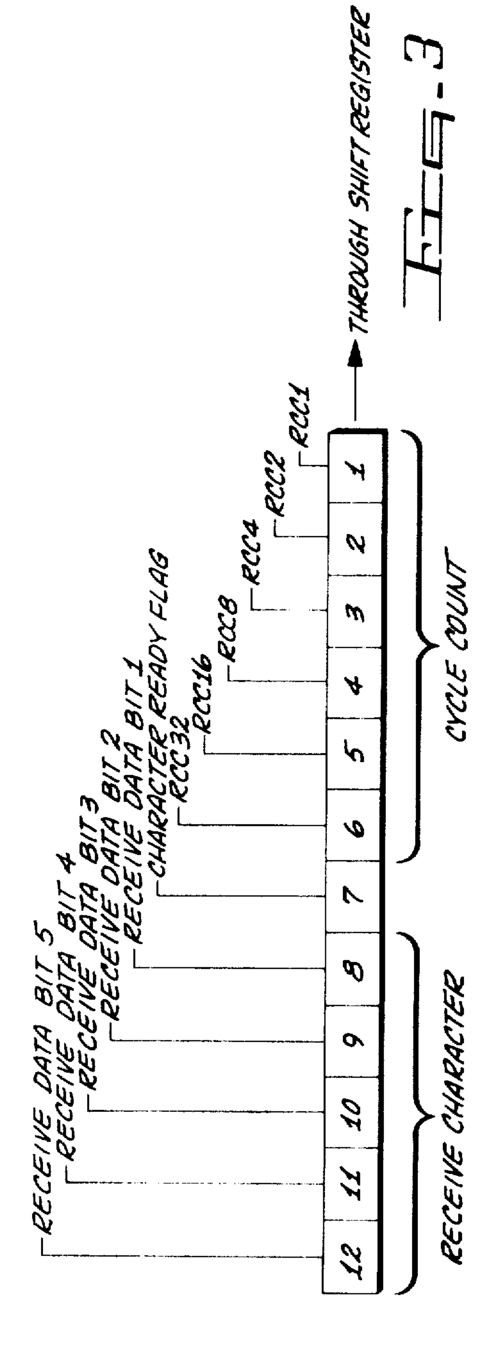
FIG. 3 shows the composition of a channel word stored in the data recirculator.

Binary data comprising the five data bits, the cycle count and a bit which tells when a complete character has been assembled in the recirculator is known as a channel word. Such a channel word is shown in FIG. 3. Flip-flops **47*a*–47*e* in the shift register 14 received the data bits, one at a time, and the flip-flops 48*a*–48*f* contain the cycle count of the particular character coming from a given input channel. The flip-flop 47*f* is energized when the complete character is ready to be transferred to the data processor. An adder circuit 50 connected to the output of the receive shift register 14 updates the cycle count each time that a channel word from a given channel circulates through the shift register 14. The flip-flop 49*a* provides a one bit which causes the adder circuit to add one to the count each time that the cycle count portion of a channel word goes through the adder circuit 50. Flip-flop 49*b* stores any carry which developes in adder 50. Adder 50 and flip-flops 49*a* and 49*b*** comprise a counter which counts the number of data bits stored in the shift registers and in the delay line by counting the number of times that data circulates through the shift register. Thus, the receive data recirculator provides a precision time base for the synchronization of incoming data from the peripheral devices. The data recirculator provides buffer storage of data which is received bit serially so that the data is transferred in bit parallel to the processor.

A detailed description of the transfer of a character from the signal-input terminal of channel 1 to the shift register of FIG. 6 will now be given in connection with the character word shown in FIG. 2, the receive channel word shown in FIG. 3, the receive module shown in FIG. 6, and the receive control logic shown in FIG. 7. While channel 1 is being used as an example, it should be understood that the same type of transfer operation will be in connection with each of the channels 0–63. Before the start of the character, the voltage at the signal-input terminal **6*b* has a positive value as shown in FIG. 2 prior to time $t_0$. Since channel 1 does not have a character in the shift register 14 at this time, the outputs of the flip-flops 48*a*–48 will be positive at the 0 output leads so that we have a positive signal at $\overline{RCC32}$, $\overline{RCC16}$, $\overline{RCC8}$, $\overline{RCC4}$, $\overline{RCC2}$, and $\overline{RCC1}$. These output leads from the flip-flops 48*a*–48*f* are coupled to the input of the AND-gate 53*a*** shown in FIG. 7 and produce a positive signal at the lead labeled RCC=0.

The positive signal on the RCC=0 lead is applied to the lower lead of AND-gate **57*a*. When the start of a character is received at input terminal 6*b* (FIG. 5) a negative signal (see FIG. 2) is coupled through level changer 7*b* and gate 8*b* to data bus 45. This negative signal is coupled by data bus 45 (FIG. 7) to inverter 54*a* which produces a positive signal on the upper lead of AND-gate 57*a*. The positive signals on the lower and upper lead of AND-gate 57*a* enable this gate so that a logic pulse from counter 30 (FIG. 4) coupled to the center lead of gate 57***a* (FIG. 7) produces a positive pulse on the upper lead of OR-gate 58. OR-gate 58 and inverter 59 produce a negative pulse on output lead 60.

The negative pulse on lead 60 is coupled to the set input terminal of the add flip-flop 49*a* shown in FIG. 6 causing a binary 1 to be stored in the add flip-flop 49*a*. Flip-flop 49*a* supplies a binary 1 at the B input terminal of the adder 50 so that the cycle count is now 1 for receive channel 1 word. Each time that the channel 1 word moves into the shift register another binary 1 will be stored in the add flip-flop 49*a*. When the count in the channel word is not equal to 1 the output of gate 53*a* (FIG. 7) is negative on the RCC=0 lead. This negative signal is converted by inverter 54*b* to a positive signal and coupled to AND-gate 57*b*. When the count in the channel word is not equal to 45 the output of gate 53*g* is negative on the RCC=45 line. This negative signal is converted to a positive signal by inverter 54*e* and coupled to AND-gate 57*b*. When a logic pulse is applied to AND-gate 57*b* a positive pulse is coupled to OR-gate 58. This positive pulse is converted to a negative pulse by inverter 59 and coupled to flip-flop 49 (FIG. 6).

The next time the channel 1 word comes back to the receive shift register 14, a binary 1 will be in flip-flop 48*f*. At this same time, another binary 1 is stored in flip-flop 49*a* so that we have a binary 1 from flip-flop 49*a* supplied to the B input terminal of the adder circuit 50. This means as the first cycle bit of the channel 1 word goes through the adder circuit the output at the S terminal is a binary 0, the output at the $C_0$ terminal is a binary 1 which stores a binary 1 in the carry flip-flop 49*b*. The next pulse from oscillator 29 causes the second bit to shift from flip-flop 48*e* to flip-flop 48*f*. At this time a binary 1 is stored in the carry flip-flop 49*b*. There is a binary 0 in the second bit so that the flip-flop 48*b* has a binary 0. At the time the second bit is ready to be shifted into adder 50 the binary 0 in the flip-flop 48*f* and the binary 1 in the carry flip-flop 49*b* causes the adder circuit to have a binary 1 in the adder 50. This produces a binary 1 in the second bit position of the channel 1 word so that the next time that the channel 1 word shifts into the register 14 there will be a binary 0 in the flip-flop 48*f* for the first bit and there will be a binary 1 in the flip-flop 48*e* for the second bit. Each time that the word from channel 1 comes into the register 14 the count will be updated by 1 and will be stored instantaneously in the flip-flops 48*a*–48 which hold the cycle count at the time the complete channel word is in the receive shift register. The output of these flip-flop 48*a*–48*f* enable the various gates 53*a*–53*g* shown in FIG. 7.

When the cycle count in register 14 of FIG. 6 reaches a value of 10, the leads coming into the AND-gate 53*b* (FIG. 7) all have positive signals, thereby causing a positive signal to appear on the output lead RCC=10. This positive signal is applied to the lower lead of the AND-gate 55*a* and the logic pulse on lead 43 causes the AND-gate 55*a* to be enabled. If the data from bit number 1 of the character on the data bus 45 is positive gate 55*a* and inverter 56*a* provide a negative pulse to the output lead 62. This pulse on the output lead 62 is applied to the S input terminal of the flip-flop 47*e* (FIG. 6) thereby storing the data bit 1 in flip-flop 47*e*. If the data on data bus 45 is negative gate 55*a* will provide a negative signal to inverter 56*a*. Flip-flop 47*e* will not be set and a 0 will be stored in flip-flop 47*e*. In a like manner, the AND-gate 53*c* is enabled when the cycle count is equal to 17 and supplied a positive voltage to the lower lead of the AND-gate 55*b*. Gate 55*b* and inverter 56*b* provide a pulse to the output line 63. This pulse from line 63 is applied to the S input terminal of flip-flop 47*d* thereby storing the second bit of the character into flip-flop 47*d*.

It should be noted that each of the data bits is sampled in the center of the data bit. For example, data bit is sampled on the cycle count of 10 which is substantially at the center of data bit 1 as shown in FIG. 2. The square waves of voltage which represent the data bits may be distorted by noise which often changes the time duration of the data bit and also rounds off the leading and trailing edges of the square waves. Thus, the best sample of the true value of the voltage representing a data bit is at the center of the bit. The present invention provides an accurate and inexpensive method of sampling each data bit at the center of the bit.

Figure 9:
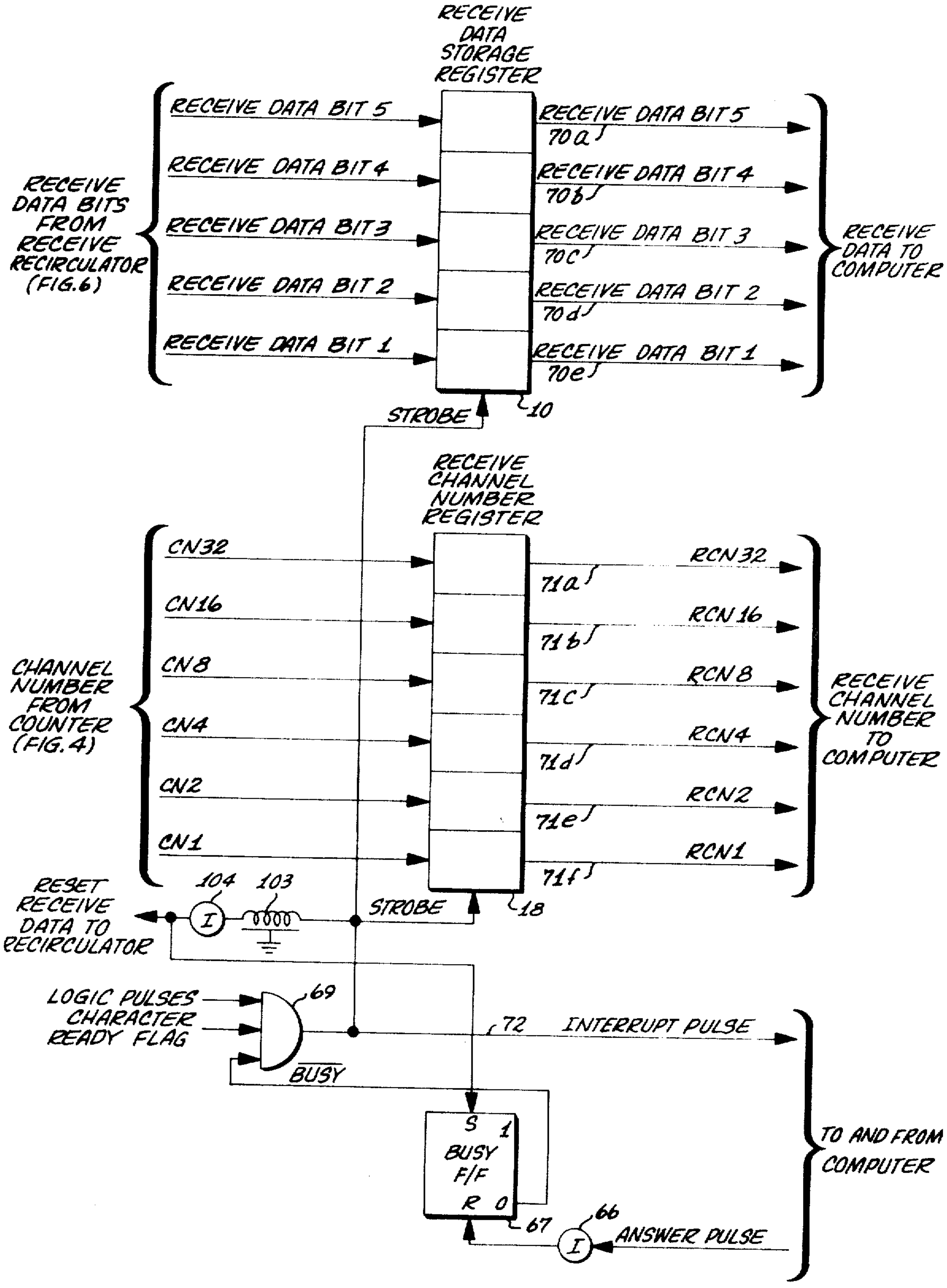
FIG. 9 shows the computer interface which is connected between the receive data recirculator and the data processor.

When the count reaches 24, the inputs to AND-gate 53*d* cause AND-gate 55*c* and inverter 56*c* to provide a pulse to the S terminal of flip-flop 47*c*. This pulse causes the data bit number 3 to be stored in flip-flop 47*c* shown in FIG. 6. When the count reaches 31, AND-gate 53*e* is enabled causing AND-gate 55*d* and inverter 56*d* to supply a pulse to the S terminal of flip-flop 47*d*. When the cycle count is equal to 38, the inputs to AND-gate 53*f* are all positive causing AND-gate 55*e* and inverter 56*e* to supply a pulse to the S input terminal of the flip-flop 47*a* in FIG. 6 thereby setting the fifth data bit in the flip-flop 47*a*. All of the data bits comprising a complete character are stored in flip-flops 47*a*–47*f* of the register 14 at the instant of time that the complete receive channel word is circulated into the register 14. 134 Also when the receive cycle count equals 38, the output AND-gate 53*f* and the logic pulse applied to AND-gate 55*f* cause a positive voltage to be applied to inverter 56*f* which supplies a set character ready signal to the S terminal of flip-flop 47*f*. This signal sets flip-flop 47*f* so that a positive signal on the 1-output lead indicates to the data processor shown in FIG. 1 that the character is complete and ready to be transferred to the data processor. The 1-output leads from the flip-flops 47*a*–47*e* are coupled to a data storage register 10 shown in FIGS. 1 and 9. When the data processor is not busy flip-flop 67 is reset to the 0-state so that flip-flop 67 provides a positive signal on the lower lead of AND-gate 69. This signal from flip-flop 67, a logic pulse from the 12 counter, and a signal from the character ready flip-flop 47*f* in FIG. 6 cause AND-gate 69 to produce a pulse at the output lead of gate 69. This pulse from gate 69 provides a strobe pulse to cause the data from bits 5 through 1 to be read into the data storage register 10. This same interrupt pulse is coupled through delay line 103 and inverter 104 to set the busy flip-flop 67 so that further interrupt pulses will not be sent to the data processor.

The leads 70*a*–70*e* at the right of data storage register 10 have the voltages which represent bits 5 through 1 ready to be delivered to the data processor. It should be noted too that a receive channel number register 18 is coupled to the channel decoder shown in FIG. 4. The various leads CN32, CN16, CN8, CN4, CN2, and CN1 from the counter 31 are coupled to the receive channel number register 18. Thus, at the same time the data from channel 1 is moved into data storage register 10, the channel number is moved into the register 18, thereby informing the data processor of the channel from which the data was received.

At the time the data is moved into data storage 10, the strobe pulse is also being applied from the output of AND-gate 69 along the lead 72 to the data processor to interrupt the operation of the data processor and cause the data from channel 1 to be transferred to the data processor. The processor accepts the data comprising a data character and the channel number and responds with an answer pulse through inverter 66 to the reset lead of flip-flop 67. This answer pulse resets flip-flop 67 so that new interrupt pulses may be generated.

When the cycle count reaches 45, the signals applied to the AND-gate 53*g* (FIG. 7) cause a positive signal on the output lead RCC=45. This positive signal and the logic pulse applied to AND-gate 55*g* produce a positive signal at the output of AND-gate 55*g*. This pulse is inverted by inverter 56*g* to provide a negative at the output lead 73. This pulse on lead 73 is applied to the reset terminals of flip-flops 48*a*–48*f* (FIG. 6) and to the reset terminal of flip-flop 49*b*, thus resetting the flip-flops which contain the cycle count for the word stored from channel 1.

Thus, it can be seen that data from the signal-input terminals is stored one bit at a time in a receive recirculating register until a complete character is assembled in the register. All of the bits of a complete character are then transferred in parallel to a receive data register and to the data processor.

Data moving from the data processor to the signal-output terminals is transferred in parallel from the processor to a transmit data register and from the transmit data register to a transmit recirculator. This data is then transferred one bit at a time from the transmit recirculator to the signal-output terminals. The process of transferring this data to the signal-output terminals will now be discussed in connection with FIGS. 1, 8, 10 and 11.

Figure 8:
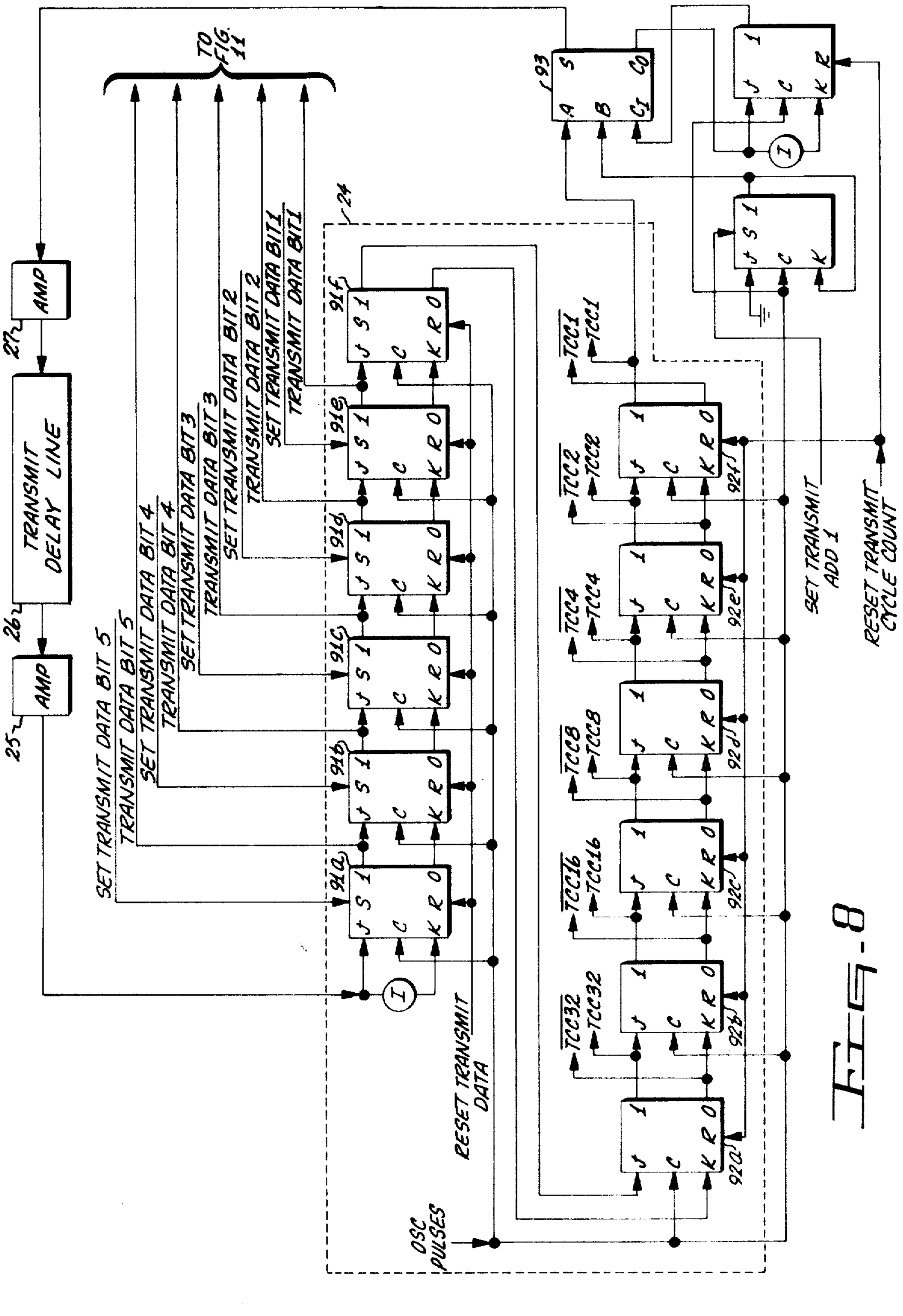
FIG. 8 is a diagram of the transmit data recirculator shown in FIG. 1.
Figure 10:
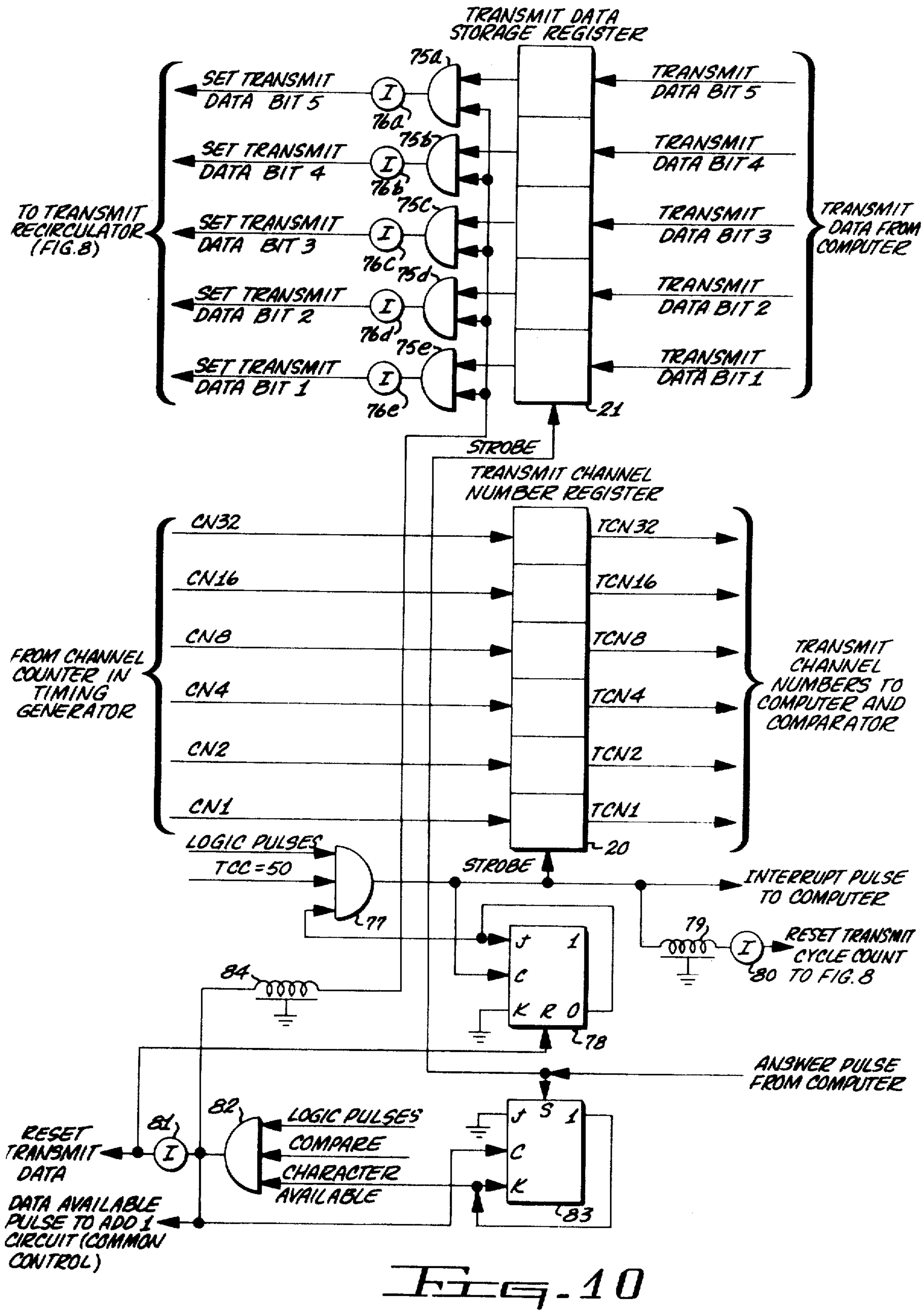
FIG. 10 shows the computer interface which is connected between the transmit data recirculator and the data processor.
Figure 11:
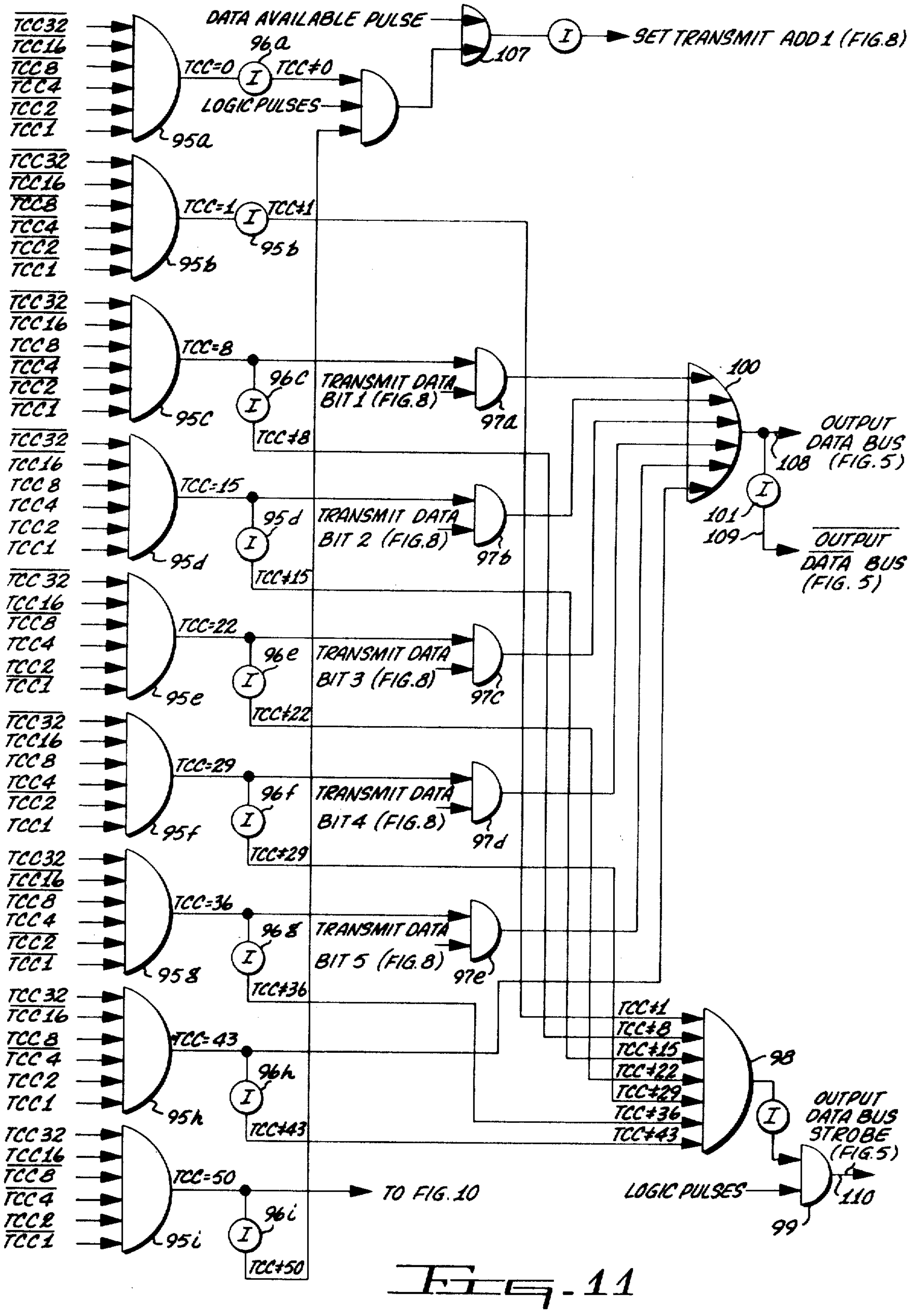
FIG. 11 shows the transmit control logic of the section of the invention shown in FIG. 1.
Figure 12:
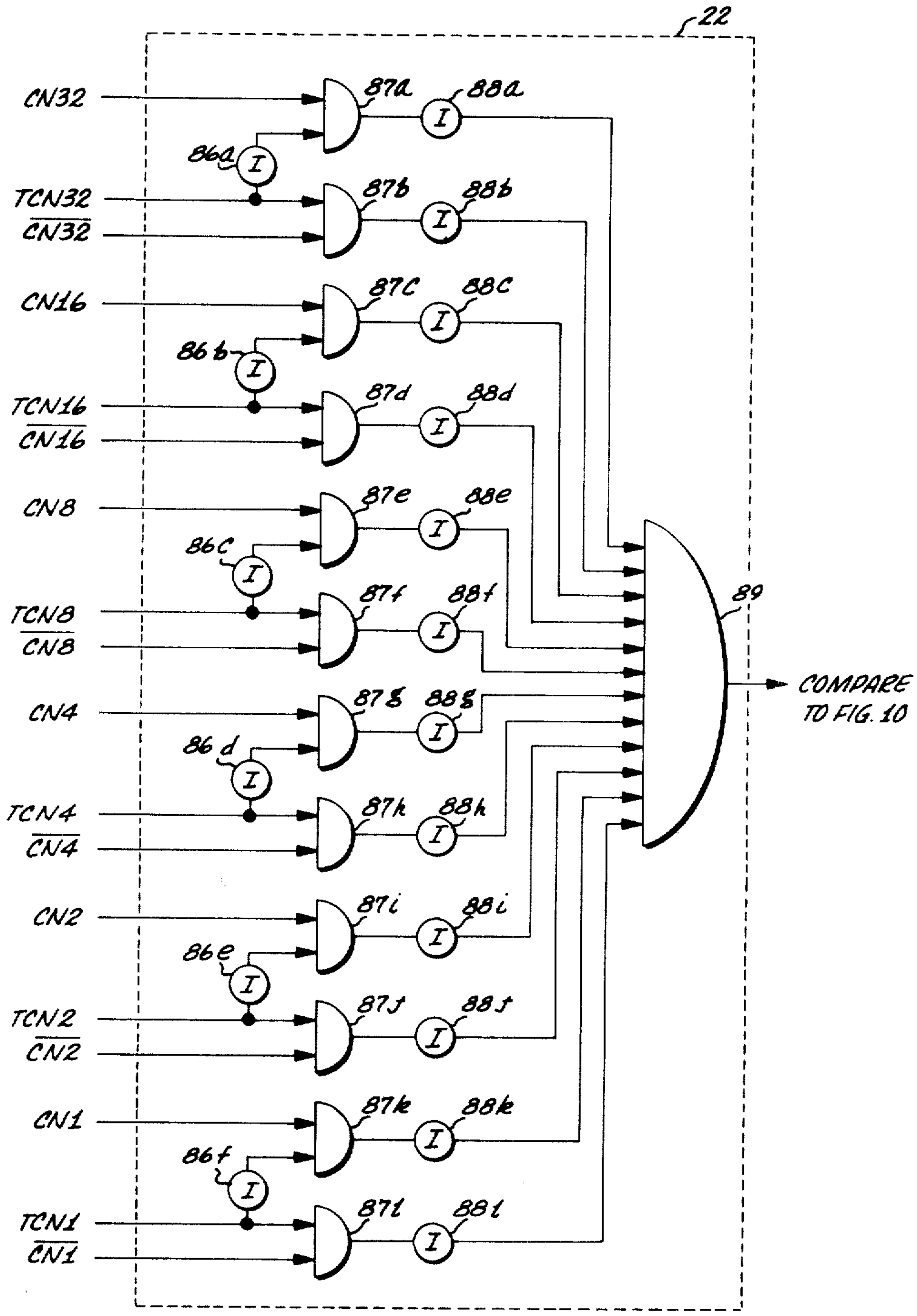
FIG. 12 shows the wiring diagram of the comparator section of the system shown in FIG. 1.

When the computer is not busy flip-flop 78 (FIG. 10) is reset to the 0-state so that the flip-flop provides a positive signal on the lower input lead of AND-gate 77. When the count in the transmit shift register 24 reaches 50, signals from the flip-flops 92*a*–92*f* (FIG. 8) cause AND-gate 95*i* (FIG. 11) to produce a positive signal on the TCC=50 output lead which is connected to the center lead of gate 77. This signal on the TCC=50 lead, a logic pulse from the counter 30 (FIG. 4) and the signal from the flip-flop 78 cause AND-gate 77 to provide a positive interrupt pulse to the data processor or computer 12 asking the computer to send data. This same interrupt pulse sets the flip-flop 78 so that further interrupt pulses will not be sent to the computer. A pulse is also applied through the delay line 79 and inverter 80 to reset the cycle count in the transmit channel shift register 24 in FIG. 8. At the same time, the interrupt pulse to the computer also strobes the count from the channel counter in the timing generator into the transmit channel number register 20 (FIG. 10). The output of channel number register 20 also is sent to the computer and to the comparator. When the computer is ready to send data to the transmit shift register, an answer pulse from the computer is applied to the strobe input of the transmit data storage register 21 and causes data for the correct channel to be strobed into the data storage register 21. The answer pulse from the computer also sets flip-flop 83 which causes a character ready signal to be applied to AND-gate 82. The channel number in channel number register 20 (FIG. 10) and the channel number in counter 31 (FIG. 4) are compared in the comparator 22 (FIG. 12). When the channel number in channel number register 20 is the same as the channel number in the counter 31, the comparator 22 provides a signal to AND-gate 82. The next logic pulse causes AND-gate 82 and inverter 81 to provide a signal pulse which resets flip-flops 91*a*–91*e* in the shift register 24 (FIG. 8). AND-gate 82 also supplies a data available pulse to OR-gate 107 which supplies a signal which adds one to the count in the register 24. The signal from AND-gate 82, delayed by delay line 84, also enables AND-gates 75*a*–75 so that the data from the data storage register 21 is stored in flip-flops 91*a*–91*e* in shift register 24.

The transmit recirculator shown in FIG. 8 is identical to the receive recirculator shown in FIG. 6, however, in the transmit recirculator the data bits are transferred into the register in parallel and are transferred out of the register one bit at a time. A start bit is transferred out when the cycle count in the recirculator is equal to 1. The first data bit is transferred out when the cycle count in the transmit recirculator is equal to 8. The other bits are transferred out of the register on the counts of 15, 22, 29 and 36. A stop bit is transferred out when the cycle count in the recirculator is equal to 43. The output lead from flip-flops 92*a*–92*f* are coupled to the input lead of AND-gates 95*a*–95*i* of the control logic of FIG. 11 and the output leads of flip-flops 91*a*–91*e* are coupled to AND-gates 97*a*–97*e* of the control logic. AND-gates 95*c*–95*h* sequentially enable gates 97*a*–97*e* and sequentially couple data bits from flip-flops 91*a*–91*e* to the output data bus 108 shown in FIGS. 11 and 5. For example, when the channel word in the flip-flops 92*a*–92 (FIG. 8) has a count of 8, the signals to the input of AND-gate 95*c* (FIG. 11) cause a positive signal to be applied to AND-gate 97a. The data bit 1 from flip-flop 91*e* in FIG. 8 is then coupled through AND-gate 97*a* and OR-gate 100 to the output data bus 108. The output data bus 108 is connected to flip-flops 35*a*–35*n* in FIG. 5 and is set into the correct flip-flop by a trigger pulse to the correct flip-flops 35*a*–35*n*. For example, if a count of 8 in transmit recirculator 24 is due to data from channel 1, the data on the output data bus 108 is the data bit 1 to be sent to the channel 1 output terminal 37*b*. A pulse on the output data bus line 110 and a signal from the counter 31 cause AND-gate 35*b* to provide a trigger pulse to flip-flop 35. This sets the data bit into flip-flop 35*b*. The bit in flip-flop 35*b* is translated to the correct signal level by level changer 36*b*.

Figure 13:
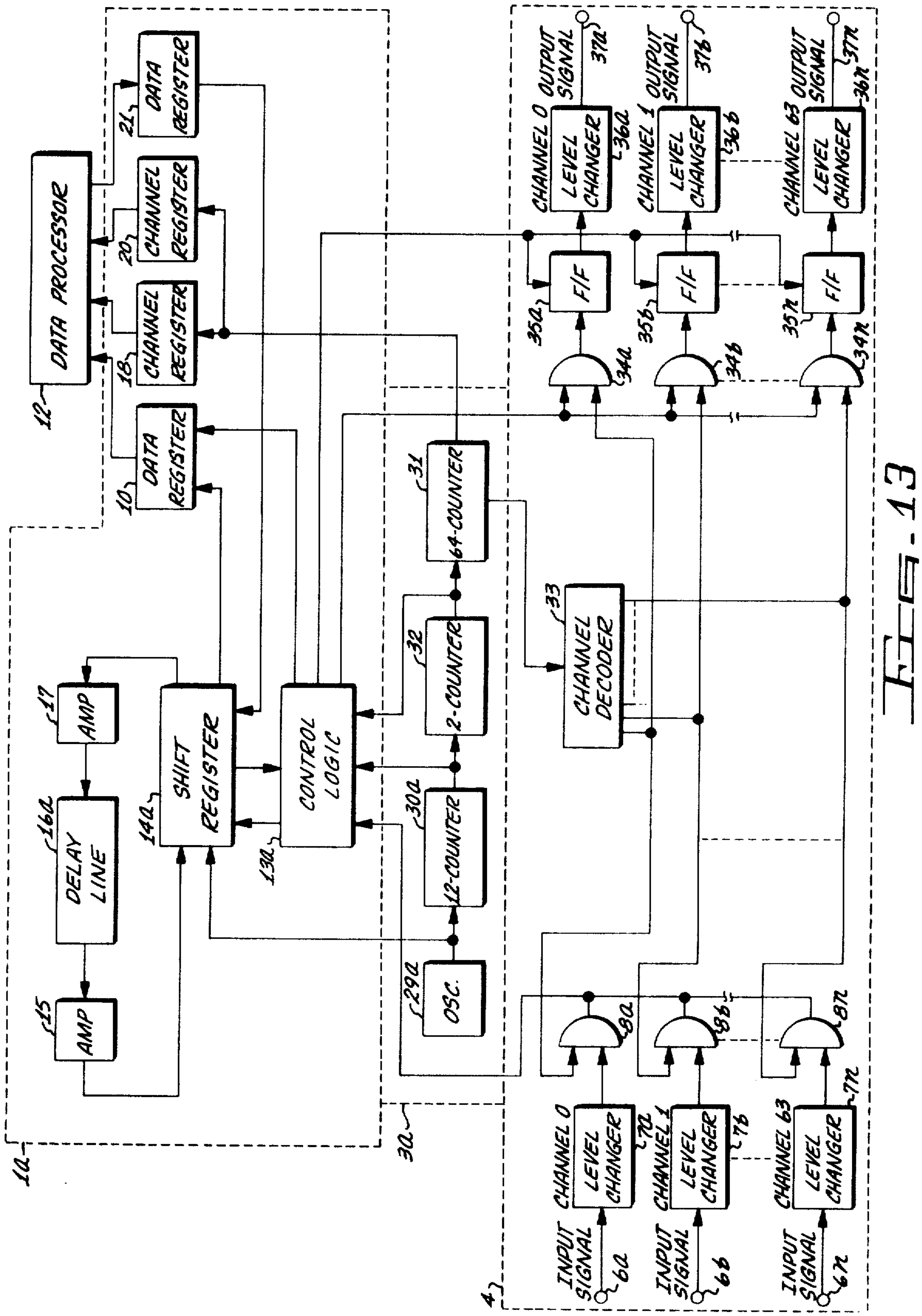
FIG. 13 is another embodiment of the apparatus shown in FIG. 1.

FIG. 13 illustrates a second embodiment of the invention shown in FIG. 1 wherein like parts have similar reference characters. The circuit in FIG. 13 differs from the circuit in FIG. 1 in that one transmit recirculator is used instead of the two used in FIG. 1. Characters being transferred from the signal-input terminals 6*a*–6*n* to the data processor 12 and characters being transferred from the data processor to the signal-output terminals 37*a*–37*n* are stored in the same transmit recirculator comprising shift register 14*a*, amplifiers 15 and 17 and delay line 16*a*. Shift register 14*a* is designed to contain two channel words at the same time for each channel instead of the one word which shift register 14 (FIG. 1) contains. The shift register contains one character coming from a channel input terminal and another character being sent to the output terminal of the same channel. For example, shift register 14*a* may contain a character being transferred from the input terminal of channel 1 to the processor and another character being transferred from the processor to the output terminal of channel 1. In addition, the cycle count for these characters is also contained in the shift register at the time these characters are in the register.

The register 14*a* is composed of the correct number of flip-flops to contain two complete characters and the cycle count. Delay line 16*a* must have sufficient storage capacity so that the delay line and the shift register can contain a total of 128 channel words, if 64 input devices and 64 output devices are connected to the input and output terminals respectively.

The size of the delay line and the size of shift register can be changed to hold more than two complete characters from each channel. The number of bits in each channel word can also be changed. The number of cycle counts for each data bit of the input characters can also be changed.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, with the limits only of the true spirit and scope of the invention.

We claim:

1. Apparatus for transferring data between a plurality of low-speed devices and a high-speed data processor comprising: a delay line; a shift register, said register being connected between a first end and a second end of said delay line; timing means; switching means, said switching means being connected between said register and each of said devices, said timing means being connected to said switching means, said timing means causing said switching means to sequentially connect each of said devices to said register, said timing means being connected to said register, said timing means causing said register to sequentially store data from each of said devices; a data register, said data register being connected between said shift register and said processor; and a counter, said counter being coupled to said shift register, said counter counting the number of bits of data received from each of said devices, said counter storing the bit count in said shift register and said delay line.

2. Apparatus for transferring data between a plurality of low-speed devices and a high-speed data processor as defined in claim 1 wherein: said counter and said timing means cause said switching means to sample each bit of data substantially at the center of the bit of data.

3. Apparatus for transferring data between a plurality of low-speed devices and a high-speed data processor as defined in claim 1 including: means for transferring data from said shift register to said data register when a complete character has been stored in said shift register and in said delay line, said means causing all of the bits of a complete character to be transferred simultaneously from said shift register to said data register, said means for transferring being connected to said data register and to said shift register.

4. Apparatus for transferring data between a plurality of low-speed devices and a high-speed data processor as defined in claim 1 wherein: said counter and said timing means causing said switching means to sample each bit of data substantially at the center of the bit of data; and means for transferring data from said shift register to said data register when a complete character has been stored in said shift register and in said delay line, said means causing all of the bits of a complete character to be transferred simultaneously from said shift register to said data register, said means for transferring being connected to said data register and to said shift register.

5. Apparatus for transferring data between a plurality of low-speed devices and a high-speed data processor comprising: a delay line; a shift register, said register being connected between a first end and a second end of said delay line; timing means; switching means, said switching means being connected between said register and each of said devices, said timing means being connected to said switching means, said timing means causing said switching means to sequentially connect each of said devices to said register, said timing means being connected to said register, said timing means causing said register to sequentially store data from each of said devices; a data register, said data register being connected between said shift register and said processor; and means for transferring data from said shift register to said data register when a complete character has been stored in said shift register and in said delay line, said means causing all of the bits of a complete character to be transferred simultaneously from said shift register to said data register, said means for transferring being connected to said data register and to said shift register.

6. Apparatus for transferring data between a plurality of low-speed devices and a high-speed data processor comprising: a delay line; a shift register, said register being connected between a first end and a second end of said delay line; timing means, switching means, said switching means being connected between said register and each of said devices, said timing means being connected to said switching means, said timing means causing said switching means to sequentially connect each of said devices to said register, said timing means being connected to said register, said timing means causing said register to sequentially store data from each of said devices; and a data register, said data register being connected between said shift register and said processor; and a channel register, said channel register being connected between said processor and said timing means, said channel register being used to store the identity of the device which provided the data stored in said data register.

7. Apparatus for transferring data between a plurality of low-speed devices and a high-speed data processor comprising: a delay line; a shift register, said register being connected between a first end and a second end of said delay line; timing means; switching means, said switching means being connected between said shift register and each of said devices, said timing means being connected to said switching means, said timing means causing said switching means to sequentially connect each of said devices to said shift register, said timing means being connected to said shift register, said timing means causing said shift register to sequentially store data from each of said devices; a data register, said data register being connected between said shift register and said processor; a channel register, said channel register being connected between said processor and said timing means, said channel register being used to store the identity of the device which provided the data stored in said data register; a counter, said counter being coupled to said shift register, said counter counting the number of bits of data received from each of said devices, said counter storing the bit count in said shift register and in said delay line; and means for transferring data from said shift register to said data register when a complete character has been stored in said shift register and in said delay line, said means for transferring causing all of the bits of a complete character to be transferred simultaneously from said shift register to said data register, said means for transferring being connected to said data register and to said shift register.

8. Apparatus for transferring data between a plurality of low-speed devices and a high-speed data processor comprising: a delay line; a shift register, said register being connected between a first end and a second end of said delay line; timing means; first and second switching means, said first switching means being connected between said shift register and each of a plurality of input devices, said second switching means being connected between said shift register and each of a plurality of output devices, said timing means causing said first switching means to sequentially connect each of said input devices to said shift register, said timing means causing said second switching means to sequentially connect each of said output devices to said shift register, said timing means being connected to said shift register, said timing means causing said shift register to sequentially store data from each of said input devices and to transfer data sequentially to each of said output devices; first and second data registers, each of said data registers being connected between said shift register and said data processor.

9. Apparatus for transferring data between a plurality of low-speed devices and a high-speed data processor as defined in claim 8 including: a counter, said counter being coupled to said shift register, said counter counting the number of bits of data received from each of said input devices and storing the bit count of said data received in said shift register and said delay line, said counter counting the number of bits of data transferred from said shift register to each of said output devices, said counter storing the bit count of said data transferred in said shift register and in said delay line.

10. Apparatus for transferring data between a plurality of low-speed devices and a high-speed data processor as defined in claim 8 including: a counter, said counter being coupled to said shift register, said counter counting the number of bits of data received from each of said input devices and storing the bit count of said data received in said shift register and said delay line, said counter counting the number of bits of data transferred from said shift register to each of said output devices, said counter storing the bit count of said data transferred in said shift register and in said delay line, said counter and said timing means causing said switching means to sample each bit of data substantially at the center of the bit of data.

11. Apparatus for transferring data between a plurality of low-speed devices and a high-speed data processor as defined in claim 8 including: first and second channel registers, each of said channel registers being connected between said shift register and said processor.

12. Apparatus for transferring data between a plurality of low-speed devices and a high-speed data processor as defined in claim 8 including: means for transferring data from said shift register to said first data register when a complete character has been stored in said shift register and in said delay line, said means causing all of the bits of a complete character to be transferred simultaneously from said shift register to said data register, said means for transferring being connected between said first data register and said shift register; and means for transferring data from said second data register to said shift register, said means for transferring said data from said second data register to said shift register being connected between said processor and said shift register.

13. Apparatus for transferring data between a plurality of low-speed devices and a high-speed data processor comprising: first and second shift registers; first and second delay lines, each of said shift registers being connected between a first end and a second end of a corresponding one of said delay lines; timing means; first and second switching means, said first switching means being connected between said first register and each of a plurality of input devices, said second switching means being connected between said second shift register and each of a plurality of output devices, said timing means being connected to said first and to said second switching means, said timing means causing said first switching means to sequentially connect each of said input devices to said first shift register, said timing means causing said second switching means to sequentially connect each of said output devices to said second shift register, said timing means being connected to said first and to second shift registers, said timing means causing said first shift register to sequentially store data from each of said input devices, said timing means causing data to be sequentially transferred from said second shift register to each of said output devices; and first and second data registers, said first data register being connected between said first shift register and said processor, said second data register being connected between said second shift register and said processor.

14. Apparatus for transferring data between a plurality of low-speed devices and a high-speed data processor as defined in claim 13 including: first and second counters, said first counter being coupled to said first shift register, said first counter counting the number of bits of data received from each of said input devices, said counter storing the bit count in said shift register and said first delay line, said second counter being coupled to said second shift register, said second counter counting the number of bits of data transferred from said second shift register to each of said output devices, said second counter storing the bit count in said second shift register and in said second delay line.

15. Apparatus for transferring data between a plurality of low-speed devices and a high-speed data processor as defined in claim 13 including: first and second counters, said first counter being coupled to said first shift register, said first counter counting the number of bits of data received from each of said input devices, said counter storing the bit count in said shift register and said first delay line, said first counter and said timing means causing said switching means to sample each bit of data substantially at the center of the bit of data, said second counter being coupled to said second shift register, said second counter counting the number of bits of data transferred from said second shift register to each of said output devices, said second counter storing the bit count in said second shift register and in said second delay line.

16. Apparatus for transferring data between a plurality of low-speed devices and a high-speed data processor as defined in claim 14 including: first and second channel registers, said first channel register being connected between said timing means and said processor, said second channel register being connected between said timing means and said data processor, said second channel register being coupled to said shift register.

UNITED STATES PATENT OFFICE
CERTIFICATE OF CORRECTION

Patent No. 3,587,059 Dated June 22, 1971

Inventor(s) James A. Kennedy et al.

It is certified that error appears in the above-identified patent and that said Letters Patent are hereby corrected as shown below:

On the cover sheet [73], "General Electric Company" should read -- Honeywell Information Systems Inc. --.

Signed and sealed this 2nd day of May 1972.

(SEAL)
Attest:

EDWARD M.FLETCHER,JR.
Attesting Officer

ROBERT GOTTSCHALK
Commissioner of Patents